Figure 1:
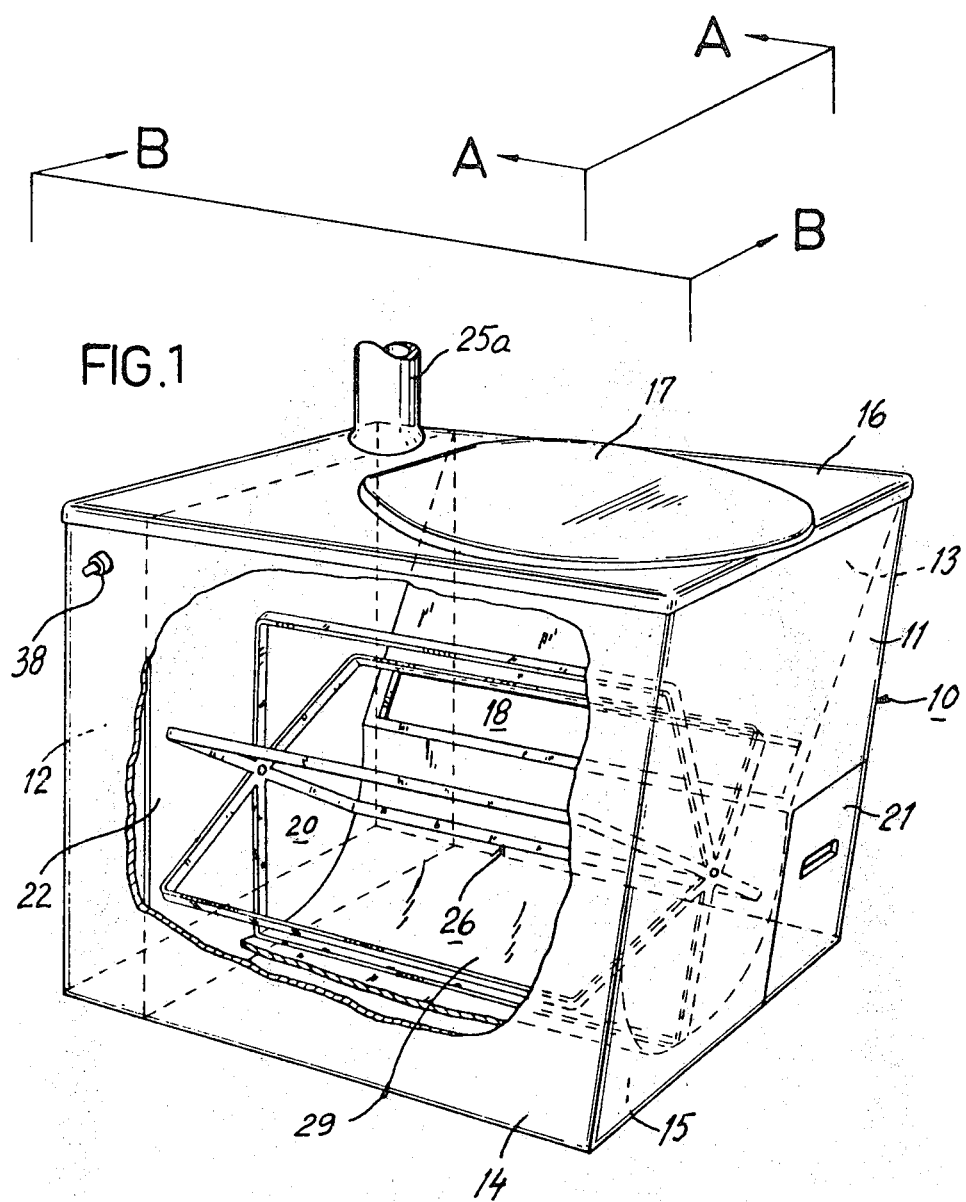

United States Patent [19]

Persson

[11] 4,343,051
[45] Aug. 10, 1982

[54] DECOMPOSITION CONTAINER, ESPECIALLY A DECOMPOSITION LATRINE

[75] Inventor: Nils C. Persson, Östersund, Sweden

[73] Assignee: Inventor Invest AB, Östersund, Sweden

[21] Appl. No.: 198,015

[22] PCT Filed: Nov. 5, 1979

[86] PCT No.: PCT/SE79/00225
§ 371 Date: Jul. 6, 1980
§ 102(e) Date: Jul. 6, 1980

[87] PCT Pub. No.: WO80/00962
PCT Pub. Date: May 15, 1980

[30] Foreign Application Priority Data

Nov. 6, 1978 [SE] Sweden .................................. 7811469
Feb. 1, 1979 [SE] Sweden .................................. 7900891

[51] Int. Cl.³ .............................................. A47K 11/06
[52] U.S. Cl. ....................................... 4/111.1; 4/111.2;
4/111.5; 4/449; 4/DIG. 12

[58] Field of Search ................ 4/DIG. 12, 449, 111.1,
4/111, 111.6, 111.2, 111.5, 352, 300, 317, 347,
348, 434

[56] References Cited

U.S. PATENT DOCUMENTS

| | | | |
|---|---|---|---|
| 3,840,907 | 10/1974 | Sundberg | 4/DIG. 12 |
| 3,859,672 | 1/1975 | Modig | 4/DIG. 12 |
| 4,096,592 | 6/1978 | Clark | 4/DIG. 12 |
| 4,196,477 | 4/1980 | Stewart | 4/DIG. 12 |
| 4,240,164 | 12/1980 | Lind | 4/DIG. 12 |

*Primary Examiner*—Henry K. Artis
*Attorney, Agent, or Firm*—Young & Thompson

[57] ABSTRACT

A decomposition latrine has a chamber (20) in which decomposable material (27) is heated with the help of a heat source (28) to a temperature in the range of 45°–80° C., the attainment of a rapid thermophilic decomposition process with simultaneous pasteurization of the material thus being enabled before the material is removed from the chamber. The pasteurized portion of the mass is movable away from the region at the heat source with the help of a stirrer (26), rotatable by means of an electric motor.

6 Claims, 5 Drawing Figures

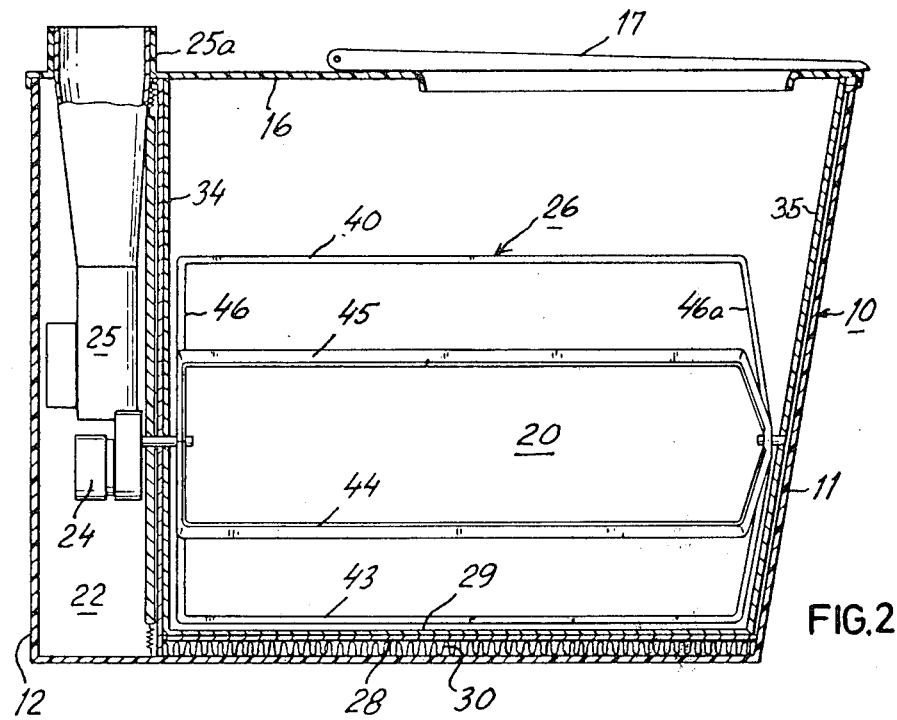

DECOMPOSITION CONTAINER, ESPECIALLY A DECOMPOSITION LATRINE

The present invention relates to decomposition containers. The invention primarily relates to decomposition latrines of the kind comprising a chamber with a heat source associated therewith, such as an electric heating element for heating excrement or other decomposable organic material in the chamber.

Most of the decomposition latrines known and used up to now have a decomposition chamber and an electric heating element arranged along the bottom of the chamber for heating up the mass in the chamber. Stirring means, rotatable about a horizontal axis, can furthermore be arranged in the chamber for providing mixture of the constituent parts of the mass to a more or less homogeneous and porous mass, which is acted on by the oxygen in the air flowing through the chamber. The mass is kept heated to a temperature of about 25° C. for somewhat accelerating decomposition. Such a decomposition latrine is illustrated and described in the Swedish Patent 7402187-4.

The known decomposition latrine has a mode of operation such that, when the mass has partially decomposed and is to be removed from the chamber, a hatch must be opened in one side of the chamber, whereafter it is possible to use the stirring means to move decomposed material from the chamber and out through the opening uncovered by the hatch, so that the decomposed material falls down into a secondary chamber. The partially decomposed material often contains certain types of sickness-generating bacteria, fly eggs and other unhygienic constituents however, which are not desirable in the final product, since it is to be handled by people and possibly used as manure. For rendering these constituents innocuous, the wholly or partially decomposed material is subjected to heating in the secondary chamber, in the known decomposition latrine, to a temperature which is considerably higher than the decomposition temperature used in the first chamber and which is intended to provide pasteurization.

Pasteurization is obtained at a temperature of about 55° C., although the temperature should preferably reach 67° C., at least for a short time, so that pasteurization is done rapidly. In the known latrine, there is a further heat source in the form of an electric heating element situated at the bottom of the secondary chamber, there to provide a temperature of about 70° C. However, the temperature decreases rapidly further up in the decomposed material lying stationary in the secondary chamber. Pasteurization of the final product in the known latrine will therefore not be satisfactorily carried out in the major portion of the mass.

Characteristic of the known decomposition toilet is thus that decomposition and pasteurization are done in two separate operations and in two separate chambers. Decomposition takes place at the temperature in the interval of 25° to 30° C., i.e. in the temperature range known as the mesophilic temperature range. The decomposition process in the thermophilic temperature range is many times quicker than that in the mesophilic.

The present invention has the object of providing a decomposition container or decomposition latrine, in which decomposition and pasteurization can be performed more simply and in a mode which is quicker and more effective than in the known decomposition latrine. This is achieved with a decomposition container which, according to the invention, is distinguished in that the heat source is provided to raise the temperature of the mass in the chamber to a value of between 45° and 80° C., enabling a rapid thermophilic decomposition process simultaneously as rapid pasteurization, the pasteurized portion of the mass being movable from the region at the heat source with the help of a stirring means, rotatable by means of an electric motor.

Since the stirring means in the container in accordance with the invention continuously or intermittently stirs the mass in the chamber, the temperature in the portion of the mass lying in the vicinity of the heat source will have a temperature in the upper part of the thermophilic temperature range, e.g. about 70° C. This gives rapid pasteurization of the material. The temperature at a greater distance from the heat source is however lower, but still within the lower part of the thermophilic temperature range, e.g. about 50° C., so that effective decomposition is obtained simultaneously with pasteurization.

With the help of a simple, conventional thermostat at the bottom of the chamber, it is easy to control conventional switch means for switching-in or switching-off the electric motor of the stirring means and for switching-in and switching-off the electric heating element. The thermostat is thus adjusted so that it comes into action at an upper boundary temperature which is obtained when the temperature in the mass in the vicinity of the thermostat has risen to about 70° C., i.e. a temperature lying in the upper part of the thermophilic temperature range, and at a lower boundary temperature attained when the temperature has dropped to about 50° C. in the mass in the vicinity of the thermostat, i.e. a temperature which lies in the lower part of the thermophilic temperature range. At the upper boundary temperature, the thermostat actuates the switch means in such a way that the heating element is switched off, and the electric motor of the stirring means is connected in for effecting a predetermined rotation of the stirring means so as to stir the mass in the chamber. The pasteurized portion of the mass will thus be moved away from the area around the thermostat. New mass at a lower temperature and not yet pasteurized will thus be supplied to the area around the thermostat, so that the temperature sinks down to the lower boundary temperature. When this temperature has been reached, the thermostat is disposed for actuating the switch means in such a way that the heating element is switched in for heating until the upper boundary temperature has been reached once again. At the same time the stirring means may be switched on for a predetermined rotation. The obtained pasteurization of the material, in accordance with the present invention, thus takes place in the whole mass but is carried out most rapidly in the area around the thermostat. Since, due to the stirring process, all material passes the hot area around the thermostat, all material will furthermore be subjected to this quicker pasteurization.

The thermostat and its control by a conventional switch means are simple and cheap details of known embodiment, but the use of these details described above as a means for controlling decomposition and pasteurization in the chamber provides a considerable simplification of the construction and maintenance of the container. For example, the user of the latrine does not need to come into contact with any unhygienic final product, since the pasteurization takes place here before emptying. In the known decomposition latrine, two heating elements are used, but in the decomposition container in accordance with the invention only one heating element need be used. In the container in accordance with the invention, decomposition takes place in the thermophilic temperature range, in contradistinction to the known container where decomposition takes place substantially in the mesophilic temperature range, and as a result hereof there is provided a quicker decomposition in the inventive container, which is thereby given greater capacity.

To achieve an effective decomposition and simultaneously effective pasteurization, it is of the greatest importance that the stirring means performs effective stirring and mixture of the different ingredients of the mass. For this purpose, the stirring means in accordance with the invention is to advantage formed in a novel mode in relation to the stirring means in the known decomposition latrine. In the known latrine, the stirring means consists of a rotatable shaft provided with a plurality of radial pins serving as stirring members to stir up the mass in the chamber. In the decomposition container in accordance with the invention, a stiring means is used instead which is distinguished in that flat bar-shaped members are used as stirring members, said members extending between the end walls of the chamber and along a rotation surface close to the curved bottom of the chamber and substantially concentric therewith. The flat bar-shaped members have a width several times greater than their radial thickness. Such a stirring means in accordance with the invention can be made with bars having rectangular cross section. The number of bars is suitably in the region of six to twelve bars uniformly distributed around the rotation surface. Such a stirring means results in a lower torque requirement than the known stirring means, and provides effective mechanical transport of material saturated with urine and other liquid and located in the lower portion of the mass. This material is then transported to the upper side of the mass, where the liquid can evaporate relatively easily. The bar-shaped stirring members move substantially along the whole of the surface of the chamber in contact with the mass, in such a way that almost no material will lie undisturbed but most of it is moved by the stirring means.

Emptying the previously mentioned known container is performed in a way which is comparatively complicated as well as unhygienic. First of all a hatch must be opened manually, subsequent to which the partially decomposed and unclean material must be transferred by a lever to a low noncorrosive box. Since the unclean material catches in the hatch opening, the latter must be cleaned up before the hatch can be put back. Furthermore, the material which has fallen down into the box must be spread out with a rod so that it is evenly distributed in the box. Thereafter, according to the manufacturer's instructions, a small amount of water must be added to the box so that the heat supplied at the bottom thereof will be spread upwards in the pile of material. In order to retain the heat so that the temperature at the surface will not be too low, the user must furthermore cover the box with an aluminium foil to prevent heat transport from the unclean material in the box. After this, a timer must be turned to switch on the heating element for six hours. Only thereafter, after having become cool, the material can be taken out.

On the other hand, emptying the latrine in accordance with the invention can be done in a substantially more simple and hygienic way. This is achieved in that the electric motor of the stirring means is coupled for alternatively driving in either direction, i.e. its direction of rotation is reversible, which is enabled conventionally with the aid of a reversing switch. As with the known latrine, the latrine in accordance with the invention is made in such a way that in the side wall forming part of the curved bottom of the chamber, there is an emptying opening. The known toilet has however a stirring means which can be rotated in only one direction, namely in a direction from the bottom of the chamber and up to the emptying opening, which therefore must be closed by a hatch during normal operation of the latrine.

No hatch is required in the inventive container, and the emptying opening can remain open even during normal operation. This is enabled in that the normal direction of rotation of the stirring means is such that the stirring members are moved away from the emptying opening and down towards the bottom of the chamber, so that the organic material in the chamber is transported away from the opening the whole time. When the organic material has decomposed and has been pasteurized in the chamber, and it is desired to remove it from the chamber, all that is needed is to operate the reversing switch to start the stirring means rotating in the opposite direction, resulting in that the pasteurized material is transported up towards the emptying opening and out through it into a collection chamber, which can comprise a box containing a collection bag. This box thus consists of a separate part which can be taken out from the container in a simple way and thereafter it is easy to lift out the bag with the pasteurized material. After removing the bag, it can be closed so that the pasteurized material can be transported without the risk of dirtying. The collection chamber can thus be easily kept clean and hygienic.

These and other details and advantages characteristic of the invention will now be explained in detail while referring to two embodiments illustrated on the accompanying drawings, in the form of decomposition containers in accordance with the invention.

Figure 4:
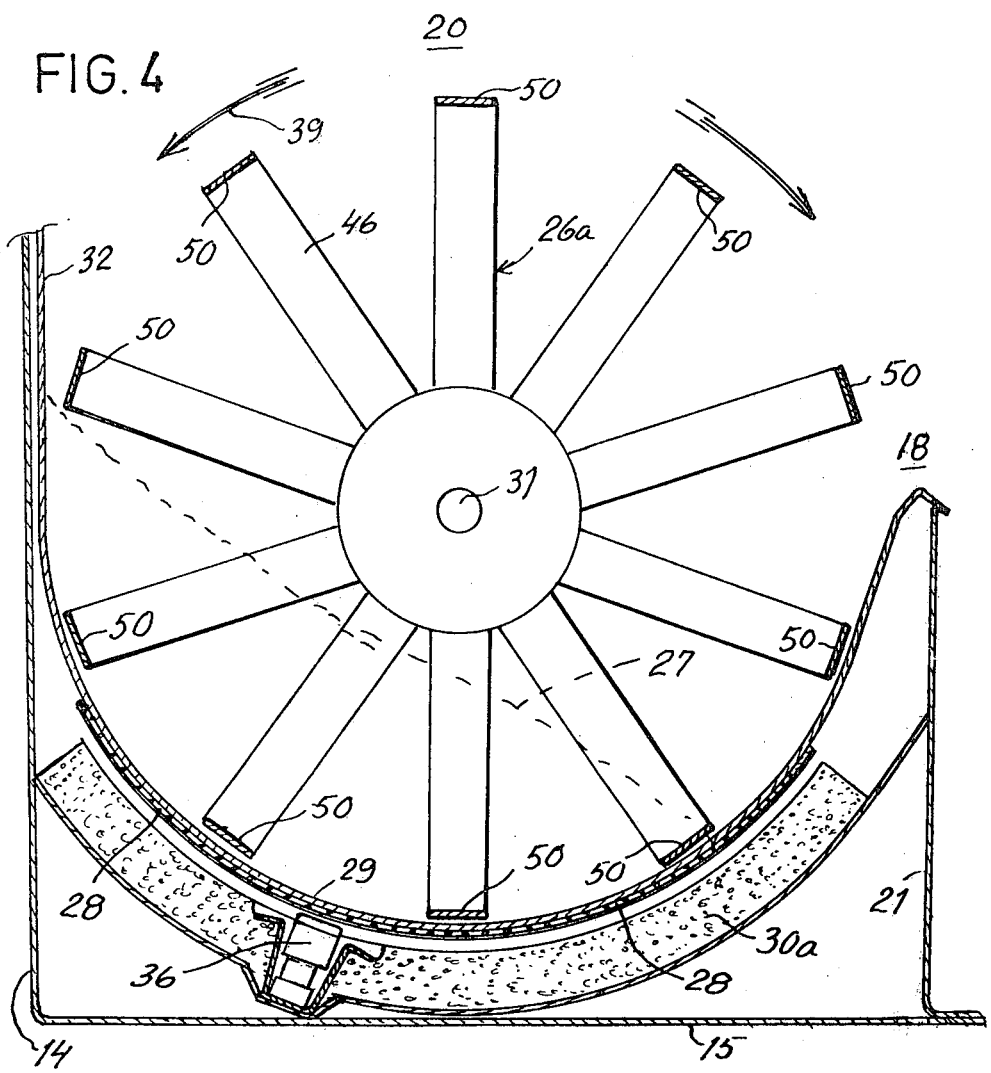
Figure 5:
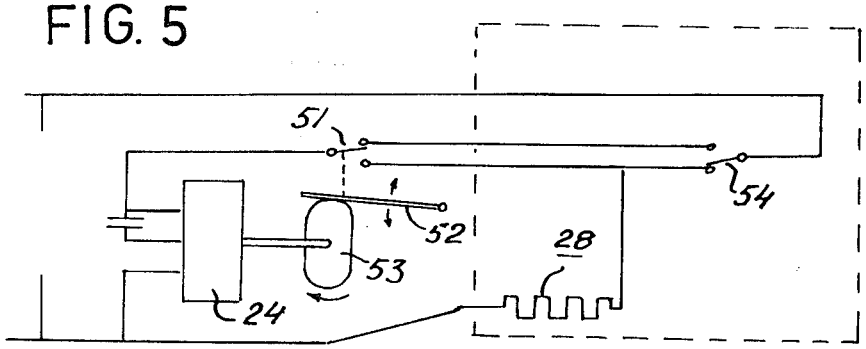

FIG. 1 is a schematic, partial perspective view of a decomposition container in accordance with the invention, functioning as a latrine, FIG. 2 is a vertical section through the latrine along the line B—B in FIG. 1, FIG. 3 is a vertical section through the latrine along the line A—A in FIG. 1, FIG. 4 is a diagrammatic sectional view of a portion of the second embodiment, and FIG. 5 is a simplified electric circuit to indicate a conventional control of the electric motor and the heating element by means of a thermostat.

The illustrated latrine comprises a container 10 with a front wall 11, a rear wall 12, two side walls 13,14, a bottom wall 15 and an upper wall 16. In the upper wall there is an opening forming the seat of the latrine and which is closable by a lid 17 which can be lifted up.

An inner container or chamber 20 is arranged inside the container, to receive organic material which is to be decomposed and pasteurized.

At the side of the chamber 20 there is a collection chamber 21 in the form of a withdrawable box, which can receive decomposed and pasteurized material discharged from the chamber 20 through an opening 18 protected by a small roof 18a.

Inside the rear wall 12 of the container there is a motor room 22, in which is arranged an electric motor 24 with gearbox for driving a stirring means 26, rotatable about a horizontal axis. There is also an evacuation fan 25 in the room 22, for extracting air through the chamber and blowing it out through a pipe 25a.

The organic mass 27 (FIG. 3) in the chamber 20 can be heated by a heat source in the form of an electric heating element 28, which can be of a known embodiment and which lies along the underside of the curved bottom 29 of the chamber.

There is insulation material 30 between the container 10 and the walls of the chamber 20.

The parts of the chamber 20 are made from material which stands up against corrosion and heat, and which is resistant against chemicals, e.g. plastics or sheet material well protected against rust.

The cylindrically curved bottom 29 of the chamber 20 is concentric with the horizontal rotation axis 31 of the stirring means, and merges into side wall 32. The chamber also has two end walls 34,35.

The electric heating element 28 is so disposed and dimensioned that, when switched on, it is capable of heating the mass at the bottom of the chamber to a temperature causing pasteurization. This temperature is in the thermophilic temperature range, i.e. approximately between the boundary temperatures 45° C. and 80° C. To limit heating to the desired temperature, there is a conventional thermostat 36 at the bottom of the chamber, for conventionally sensing the temperature in the mass at the bottom of the chamber. When this temperature has risen to an upper boundary temperature in the upper part of the thermophilic temperature range, e.g. about 70° C., the thermostat is disposed for energizing a switch to switch off the heating element 28. The thermostat is of such a nature that the temperature is allowed to sink to a lower boundary temperature in the lower part of the thermophilic temperature range. e.g. about 50° C., where the heating element 28 is once again switched on for renewed heating.

The thermostat 36 is moreover disposed for simultaneously controlling switch means for switching on or switching off the electric motor 24 of the stirring means. When the upper temperature boundary is reached, the electric motor is thus switched on for a predetermined rotation of the stirring means in its normal direction of rotation in accordance with the arrow 37. When the temperature has fallen to the lower boundary temperature, the heating element 28 is switched on, and the electric motor is switched on for a rotation less than one revolution.

When the electrical system of the container is connected to the mains, the heating element 28 is thus first switched on, while the stirring means 26 remains idle until the temperature in the pertinent bottom region in the chamber has arrived at the upper boundary temperature. This automatic control thus prevents the stirring means from starting until the mass in the chamber has reached a sufficiently high temperature and thereby a relatively soft consistency enabling the stirring means to be rotated. This is of special importance in houses which are only used during certain periods of the year and where there is the risk of the mass in the chamber becoming heavily frozen during the winter season.

A pasteurized decomposition product is obtained as the final result of alternately heating and stirring the mass. This can subsequently be easily removed from the chamber, since the electric motor of the stirring means is reversible. Reversal of the direction of rotation of the stirring means to that indicated by the arrow 39 (FIG. 3) is provided in a known way by operating a reversing switch 38 (FIG. 1), resulting in that decomposed and pasteurized material is moved in a direction away from the bottom of the chamber and up towards the opening 18, where the decomposed and pasteurized material falls down into the collection chamber 21, e.g. a box suitably provided with a bag. After emptying, the switch 38 is operated again, for the stirring means 26 to once again assume its normal rotation in accordance with the arrow 37. The box 21 can subsequently be easily withdrawn so that the bag can be removed and closed. Handling is thus very easily carried out and hygienic.

Emptying the latrine in this simple and hygienic way need hardly be done more than every other month when the latrine is used daily by a normal-sized family, i.e. three, four or five persons.

In order that the stirring means 26 can be taken through the mass 27 with the least possible resistance simultaneously as it will mix, break up and aerate the whole mass in the chamber 20 during rotation, it is of the greatest importance that the stirring means has a design suitable for the purpose. The illustrated stirring means 26 is characterized in that it has a plurality of stirring members 40,41,42,43,44,45 which are flat and bar-shaped and consist of steel flats, and are so fitted that their narrowest sides are substantially radial and thus meet the mass during rotation in one or other direction. The bar-shaped stirring members are thus arranged such that during rotation they scrape against or move close to the whole or major portion of the curved bottom 29 of the chamber 20.

In FIG. 3 the stirring means 26 comprises six bar-shaped members. If the number of these members is less than four, the torque requirement for rotating the stirring means 26 will increase drastically.

The bar-shaped members 40-45 of the stirring means are carried by substantially radial arms 46,46a. When rotating the stirring means in the normal direction of rotation 37, or in the emptying direction 39, i.e. in the opposite direction, the bars 40-45 follow a path closely adjacent the major portion of the bottom 29 of the chamber. Hereby there is provided for the normal direction of rotation 37 an effective stirring of the whole mass in the chamber 20 simultaneously as the bars 40-45 move with relatively small resistance through the mass. The material which has been rapidly pasteurized at a relatively high temperature in the vicinity of the heating element 28 is moved to one side in the normal direction of rotation to give way to material which has possibly not been previously rapidly pasteurized, and after some time the whole mass has been converted to decomposed and pasteurized material, i.e. the intended final product.

In FIG. 4 there is shown a second embodiment of the stirring means 26a. The difference in relation to FIG. 3 is basically that the number of flat bar-shaped members 50 is greater, i.e. ten instead of six. Also, in this embodiment the radial thickness of the members 50 is relatively small and the width is relatively great. In the example shown, which is the preferred embodiment, the thickness is 3 mm and the width is 20 mm of each bar, which means that the width is about seven times greater than the thickness. The diameter of the cage-like rotor or stirring means 50 is 240 mm. A substantial part of the weight of the mass will rest on three or four flat bars 50 when they are located in the lower part of their path of rotation. Since the heavy portion of the mass, which has not yet been decomposed and pasteurized, will to a certain extent bridge the gaps between the bars 50, pasteurized material will be left in the gaps between the bars 50 to be moved by the bars along the bottom 29.

In FIG. 5 there is shown an electric circuit which may be used for both embodiments and which includes the electric motor 24, a switch 51 operated by a lever 52 cooperating with a cam 53 rotated by the motor 24 so that, when the motor is switched on, the cam 53 will permit a rotation only less than one revolution and preferably not more than a quarter of a revolution of the motor and the stirring means 26 or 26a, respectively, and then switch off the motor.

There is further the heating element 28 which is switched on or switched off by means of a switch 54 operated by the thermostat 36 in the manner described above.

I claim:

1. In a decomposition chamber for providing decomposition of a mass consisting of decomposable material, comprising a mass receiving chamber and an electric heat source (28) associated therewith to raise the temperature of the mass (27) in the chamber (20) to a value in the region of between 45° and 80° C. for providing a rapid thermophilic decomposition process as well as simultaneous pasteurization, the pasteurized portion of the mass being movable from the region at the heat source with the help of a stirring means rotatable about a horizontal axis; the improvement wherein an opening (18) is provided in one side of the chamber for discharging material with the help of the stirring means, an electric motor (24) for rotating the stirring means, and means for reversibly driving the motor in either direction, whereby when the stirring means moves down across said opening, material in the chamber is agitated without being discharged through the opening, whereas when the motor is operated in the reverse direction and the stirring means moves up across the opening, material is discharged by the stirring means through the opening.

2. In a decomposition chamber for providing decomposition of a mass consisting of decomposable material, comprising a mass receiving chamber and an electric heat source (28) associated therewith to raise the temperature of the mass (27) in the chamber (20) to a value in the region of between 45° and 80° C. for providing a rapid thermophilic decomposition process as well as simultaneous pasteurization, the pasteurized portion of the mass being movable from the region at the heat source with the help of a stirring means (26); the improvement comprising an electric motor (24) for rotating the stirring means, a thermostat (36) disposed at the bottom (29) of the chamber to sense the temperature in the portion of the mass situated in the vicinity of the thermostat, the thermostat being disposed for controlling switch means (51,54), in turn effecting the switching on or switching off of the electric motor (24), and switching on or switching off of the heat source (28) such that heating of the mass in the vicinity of the heat source to an upper boundary temperature in the upper portion of the thermophilic temperature range results in that the heat source is switched off and rotation of the stirring means is switched on with a resulting lowering of the temperature of the mass at the heat source to a lower boundary temperature in the lower portion of the thermophilic temperature range where the thermostat once again provides switching on the heat source.

3. A container as claimed in claim 2 when the thermostat (36) is influenced by the upper boundary temperature and the electric motor is thus switched on, a control means will permit the electric motor to rotate the stirring means not more than one revolution, preferably not more than about one quarter of a revolution, and then switch off the electric motor.

4. A container as claimed in claim 3, characterized in that, when the thermostat (36) is influenced by the lower boundary temperature, the thermostat is provided to switch on the electric motor, said control means permitting the electric motor to rotate the stirring means not more than one revolution, preferably not more than about one quarter of a revolution, and then switch off the electric motor.

5. A container as claimed in claim 2, wherein the chamber has two opposing end walls and a curved bottom substantially coinciding with a rotation surface, and the stirring means has a plurality of stirring members which move, during rotation of the stirring means, a portion of the material along the bottom of the chamber upwards and along one of its sides, characterized in that the stirring members consist of flat, bar-shaped members (40,41,42,43,44,45) extending between the end walls (34,35) along a rotation surface close to the bottom (29) of the chamber and substantially concentric therewith, the width of the bar-shaped members being several times greater than their radial thickness.

6. A container as claimed in claim 5, wherein an opening (18) is made in one side of the chamber for discharging material with the help of the stirring means, characterized in that the direction of rotation for the electric motor of the stirring means is reversible, the normal direction of rotation of the flat, bar-shaped members being away from said opening (18) and down towards the bottom of the chamber, whereas the reversed direction of rotation is switched on when it is desired to empty decomposed and pasteurized material out through the opening (18) with the help of the stirring means.

* * * * *